J. J. TOLAND.
FENDER.
APPLICATION FILED DEC. 12, 1912.
1,150,557.
Patented Aug. 17, 1915.
2 SHEETS—SHEET 1.
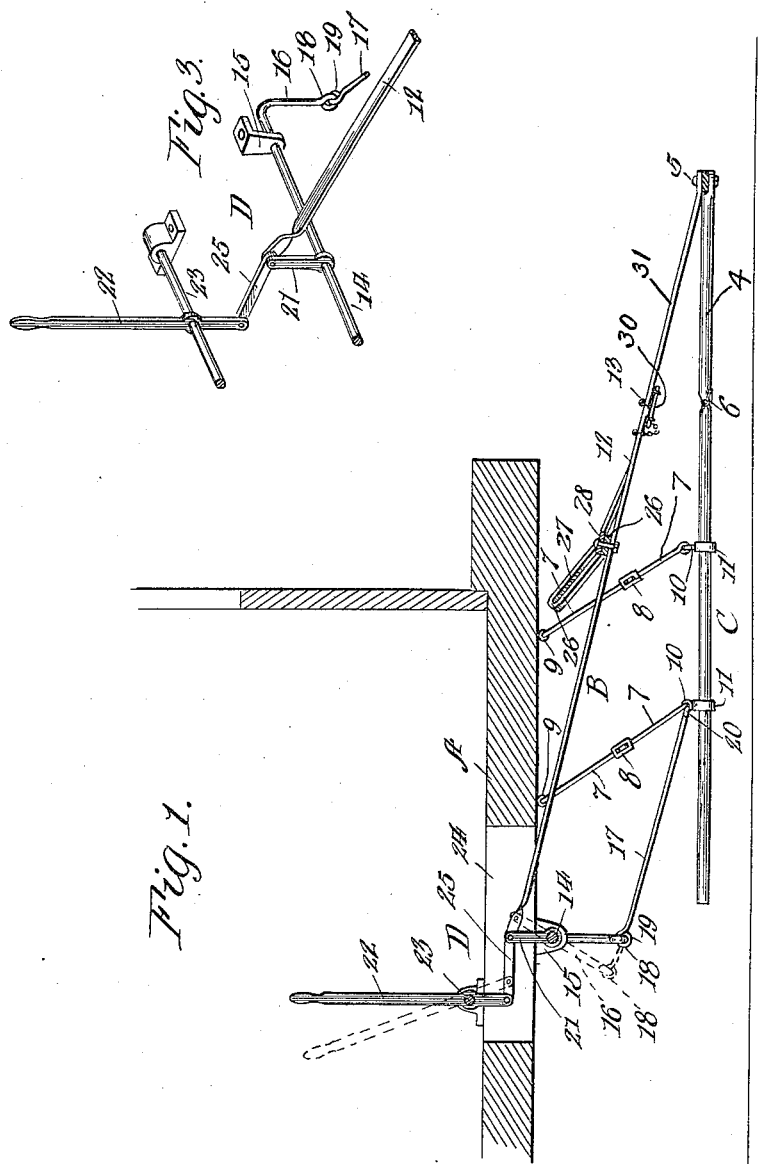
WITNESSES
G. M. Spring.
C. Everett Lancaster.
INVENTOR
James J. Toland,
Richard Owen
his Attorney

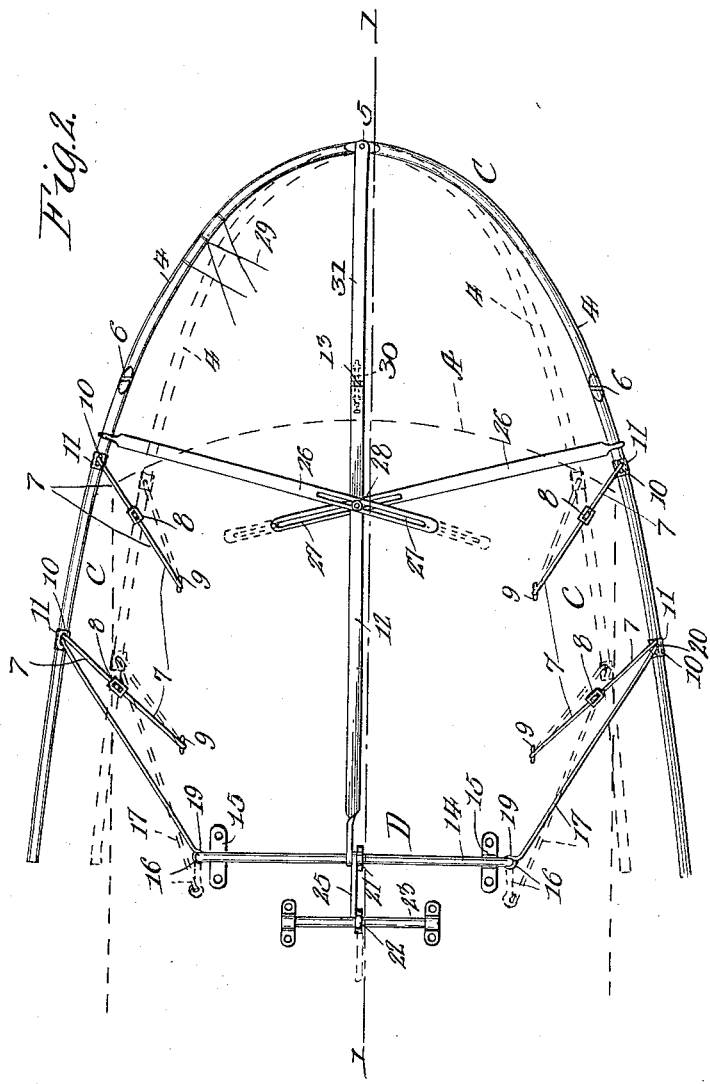

UNITED STATES PATENT OFFICE.

JAMES J. TOLAND, OF CLIFTON HEIGHTS, PENNSYLVANIA.

FENDER.

1,150,557. Specification of Letters Patent. Patented Aug. 17, 1915.

Application filed December 12, 1912. Serial No. 736,367.

*To all whom it may concern:*

Be it known that I, JAMES J. TOLAND, a citizen of the United States, residing at Clifton Heights, in the county of Delaware and State of Pennsylvania, have invented new and useful Improvements in Fenders, of which the following is a specification.

My present invention relates to fenders for moving vehicles, such as electric cars, which is carried in advance of the vehicle, and more particularly for the safety of pedestrians.

The principal object of this invention is to provide an articulated fender frame so supported and controlled from the vehicle that it may be expanded and contracted when desired, and when in an expanded condition, not only projects in front of the vehicle, but to a considerable extent laterally thereof at both sides, to guide or throw that which it encounters, out of proximity to the wheels of the vehicle.

Other objects of the invention are to provide a fender frame which is simple in construction, and hence inexpensive to manufacture; to provide a fender frame which is substantial, easily assembled and capable of attachment to existing vehicles; to provide a fender frame which will be automatically expanded when it encounters an obstacle directly in its path; to provide means whereby the frame may be expanded or contracted by mechanism extending into the vehicle; and, to provide one which may be adjusted relative to any particular vehicle and foldable with respect thereto.

In the drawings: Figure 1 is a sectional view taken on line 1—1 of Fig. 2 showing my invention attached to a vehicle, such as an electric car. Fig. 2 is a plan view of the fender, the contracted position of the fender being indicated by dotted lines. Fig. 3 is a perspective view of mechanism for expanding or contracting the fender frame.

In the drawings, where similar characters refer to similar parts, A designates a vehicle, such as a street car, which, through mechanism B pendently supports a fender frame C. Positive mechanism D is provided whereby the frame C may be expanded or contracted.

The frame C preferably comprises two complementary arcuate arms 4, pivoted to oscillate about a point 5, which is preferably in alinement with the center of the structure, and positioned forwardly of the vehicle A. The arms 4 are each hinged, intermediate their ends, as at 6, so that the front portion may be raised or swung about a common axis, these hinges being disposed, when the frame is in place upon the vehicle, so that the structure protrudes only slightly in front of the vehicle when this portion is raised.

The mechanism B preferably comprises a plurality of links 7, preferably adjustable lengthwise, as by turn buckles 8, these links being pivoted, as by eye bolts 9, to the vehicle body, and to frame C as by eye members 10, carried by collars 11 embracing the rear portions of arm 4. Thus, the frame C is pendently supported and the arms 4 are capable of oscillating about their pivot 5 to lie in close proximity to planes of the sides of the vehicle, or to swing to some distance laterally of such planes, as clearly shown in Fig. 2 of the drawing. Furthermore, the position of the frame C from the surface may be adjusted by manipulation of the turn buckles 8.

Referring now to mechanism D, it includes a main stem 12 extending longitudinally of the axis of symmetry of the frame C, pivoted thereto at one end, at point 5, and extends upwardly and rearwardly therefrom. This stem is pivoted, as at 13, so that its forward end may be swung with the arms 4, for the purpose previously described.

Oscillatably carried by vehicle A, as by shaft 14, received in bearings 15, are depending levers 16, one for each arm 4. The free end of each of these levers is connected, as by rod 17, with its respective arm 4, such as by being pivoted to the lever by coacting eye members 18 and 19, carried by members 16 and 17, respectively, and an eye 20 received by one of the eye members 10. It is to be noted that the rods 17 extend forwardly and downwardly from the levers 16 to their respective arms 4, so that when the said levers are swung forwardly, the arms 4 are swung outwardly about their pivot 5, as disclosed in full lines in Fig. 2 of the drawings. However, when the said levers are swung rearwardly, these rods draw such arms inwardly as indicated by dotted lines in said figure. The levers 16 may be oscillated through reciprocation or longitudinal movement of stem 12, as by the latter being pivoted to a lever 21 carried by shaft 11 and so that rearward movement of stem 12 swings the levers 16 forwardly. A manually operable lever 22, within the vehicle A, pivoted as at 23 and extending into an aperture 24 in the floor of the vehicle, may be operatively connected, as by link 25, to the said lever 21. By this construction, the levers 16 may be oscillated through manually oscillating lever 22. Guide rods 23 may be carried by arms 4 extending inwardly, with their free ends in close proximity to the stem 12, these rods having elongated slots 27 formed longitudinally therein, and through which passes freely a bolt 28 extending through stem 12. The slots 27 limit the amplitude of oscillation of arms 4, and serve to brace the frame C, and provide a more substantial fender.

A reticular receiver 29, of any suitable construction, may be carried by the frame C and be secured to the vehicle A, in any suitable manner, so that it is spread out to receive any object which may be thrown toward the vehicle by the fender frame encountering it, this receiver being flexible so that the arms 4 may oscillate, however, it is desirable that this receiver be tensioned when the said arms are thrown outwardly. The forward end 31 of the main stem is held rigidly in alinement with the portion 12 by means of a locking bolt 30 which passes through alining eyes on the sections 12 and 13 respectively.

The operation of the fender is as follows: Assuming, first, that the fender is in a contracted condition and engages an obstacle, by the front portion contacting therewith. The obstacle, resisting movement, forces the front portions of arms 4 rearwardly, as well as stem 12. Rearward movement of stem 12 swings the lever 16 forwardly, which spread the rear portions of arms 4, outwardly. Thus, the obstacle is either guided laterally of the path of movement of the vehicle or drops on the receiver 29. The guide rods 26 limit the outward movement of the arms 4, as previously described. Assuming, now, that the operator of the vehicle is conscious of danger ahead, and desires to avoid accident, by moving the lever 22, to the position indicated by full lines in Fig. 1, the frame C may be expanded, inasmuch as this action moves the levers 16 forwardly and the fender is so disposed as to successfully receive the obstacle or guide it from the path of movement of the vehicle.

It is to be noted, that the fender may be contracted so that it will be out of the way most of the time and so as to not engage with that which is in proximity to the wheels of the vehicle.

Changes in details may be made without departing from the spirit or scope of my invention; but,

I claim:—

1. In a fender, the combination with a vehicle, of two arcuate arms symmetrically disposed and adapted to swing toward or from each other, means for supporting said arms from the vehicle with their forward ends pivoted to each other, and mechanism for manually swinging said arms toward or from each other operable from the vehicle.

2. In a fender, the combination with a vehicle, of arms pivoted at their forward ends to oscillate toward or from each other laterally of the vehicle, means for supporting said arms from the vehicle, means for limiting the amplitude of oscillation of said arms, and means for oscillating said arms from within the vehicle, substantially as and for the purpose set forth.

3. In a fender, the combination with a vehicle, of arms pivoted to oscillate toward or from each other laterally of the vehicle and pivoted intermediate their ends to swing upwardly about a common axis, means for supporting said arms from the vehicle, and means for oscillating said arms from within the vehicle, substantially as and for the purpose set forth.

4. In a fender, the combination with a vehicle, of two arcuate arms having their forward ends pivoted at a common point, means for supporting said arms from the vehicle, a stem having one end operatively connected with said arms at their pivot point and extending rearwardly of the vehicle, and means operable upon rearward movement of said stem for swinging said arms outwardly and laterally of the vehicle, substantially as and for the purpose set forth.

5. In a fender, the combination with a vehicle, of two arcuate arms pivoted at a common point, means for supporting said arms from the vehicle, a stem having one end operatively connected with said arms at their pivot point and extending rearwardly of the vehicle, two depending levers oscillatably carried by the vehicle, links extending forwardly from said levers and operatively connected one with each of said arms, and means for oscillating said levers upon reciprocation of said stem, to move said arms toward or from each other, substantially as and for the purpose set forth.

6. In a fender, the combination with a vehicle, of two arcuate arms pivoted at a common point, means for supporting said arms from the vehicle, a stem having one end operatively connected with said arms at their pivot point and extending rearwardly of the vehicle, two depending levers oscillatably carried by the vehicle, links extending forwardly from said levers and operatively connected one with each of said arms, and a manually operable lever on said vehicle, operatively connected with said levers, to oscillate the same, substantially as and for the purpose set forth.

JAMES J. TOLAND.

Witnesses:
WILLIAM H. BOLDUC,
JAMES L. HOLSTEIN.

Copies of this patent may be obtained for five cents each, by addressing the "Commissioner of Patents, Washington, D. C."